US010981608B2

(12) United States Patent
Schneider et al.

(10) Patent No.: US 10,981,608 B2
(45) Date of Patent: Apr. 20, 2021

(54) REINFORCEMENT STRUCTURE FOR THE BACK FACE OF A VEHICLE COMPARTMENT

(71) Applicant: ArcelorMittal, Luxembourg (LU)

(72) Inventors: Nicolas Schneider, Saint-Martin Longueau (FR); Jimmy Lam, Noisy le Grand (FR)

(73) Assignee: ARCELORMITTAL, Luxembourg (LU)

( * ) Notice: Subject to any disclaimer, the term of this patent is extended or adjusted under 35 U.S.C. 154(b) by 100 days.

(21) Appl. No.: 16/468,650

(22) PCT Filed: Nov. 28, 2017

(86) PCT No.: PCT/EP2017/080619
§ 371 (c)(1),
(2) Date: Jun. 11, 2019

(87) PCT Pub. No.: WO2018/114238
PCT Pub. Date: Jun. 28, 2018

(65) Prior Publication Data
US 2020/0086932 A1    Mar. 19, 2020

(30) Foreign Application Priority Data

Dec. 21, 2016 (WO) .................. PCT/EP2016/082270

(51) Int. Cl.
*B62D 33/06*        (2006.01)
*B62D 29/00*        (2006.01)
(52) U.S. Cl.
CPC ........... *B62D 33/06* (2013.01); *B62D 29/007* (2013.01)

(58) Field of Classification Search
CPC .... B62D 33/06; B62D 33/077; B62D 29/007; B62D 23/00; B62D 23/005
(Continued)

(56) References Cited

U.S. PATENT DOCUMENTS

2010/0038930 A1    2/2010 Orii

FOREIGN PATENT DOCUMENTS

EP        0921055 A2    6/1999
EP        0921055 A3    3/2001
(Continued)

OTHER PUBLICATIONS

International Search Report issued in connection with International application No. PCT/EP2017/080619 dated Feb. 19, 2018.
(Continued)

*Primary Examiner* — Dennis H Pedder
(74) *Attorney, Agent, or Firm* — Davidson, Davidson & Kappel, LLC

(57) ABSTRACT

A reinforcement structure containing: at least one elevation reinforcement profile extending along an elevation direction; at least one transversal reinforcement profile extending along a transversal direction, substantially perpendicular to the elevation direction and at least one compartment panel extending against the elevation reinforcement profile and transversal reinforcement profile; and at least one reinforcement member extending along at least part of the elevation reinforcement profile between the elevation reinforcement profile and the compartment panel, the reinforcement member made of a material having a tensile strength greater than the tensile strength of the material forming the elevation reinforcement profile.

18 Claims, 5 Drawing Sheets

(58) Field of Classification Search
USPC .............. 296/190.01, 190.03–190.08, 29, 30
See application file for complete search history.

(56) References Cited

FOREIGN PATENT DOCUMENTS

| | | |
|---|---|---|
| EP | 1380496 A1 | 1/2004 |
| GB | 1501390 A | 2/1978 |
| JP | S5929372 U | 2/1984 |
| JP | H0450584 U | 4/1992 |
| JP | H0810077 Y2 | 3/1996 |
| JP | H09175432 A | 7/1997 |
| RU | 63310 U1 | 5/2007 |
| SU | 1765049 A1 | 9/1992 |
| WO | 2007082677 A1 | 7/2007 |

OTHER PUBLICATIONS

International Search Report issued in connection with International application No. PCT/EP2016/082270 dated Oct. 18, 2017.

REINFORCEMENT STRUCTURE FOR THE BACK FACE OF A VEHICLE COMPARTMENT

FIELD OF THE INVENTION

The present invention relates to a reinforcement structure for a vehicle compartment of a heavy goods vehicle, of the type comprising: at least one elevation reinforcement profile extending along an elevation direction, said elevation reinforcement profile defining an elevation cavity; at least one transversal reinforcement profile extending along a transversal direction, substantially perpendicular to the elevation direction, said transversal reinforcement profile defining a transversal cavity, and at least one compartment panel extending against the elevation reinforcement profile and the transversal reinforcement profile such that the compartment panel closes the elevation and transversal cavities.

The invention also relates to a vehicle compartment of a heavy goods vehicle comprising such a reinforcement structure.

BACKGROUND

A reinforcement structure is arranged to form the back face, or back wall, of a heavy goods vehicle compartment and extends between the floor and the roof of the vehicle compartment. Such a reinforcement structure forms the "backbone" of the vehicle compartment and is arranged to distribute the loads imparted on a vehicle compartment in case of an impact against the vehicle compartment between the various reinforcement members provided in the vehicle compartment to absorb the energy of the impact without deforming the space where the occupants of the vehicle are seated to prevent injuring the occupants. To this end, the reinforcement structure comprises reinforcement profiles extending along the elevation direction and the transversal direction of the vehicle compartment against a compartment panel forming the back wall of the vehicle compartment. The reinforcement profiles are arranged to distribute the loads along the elevation and transversal directions and to be deformed to absorb energy in case of an impact. However, the deformation has to be limited in order to preserve the space where the occupants are seated and in some areas, in particular where the reinforcement structure is attached to other elements, no deformation at all is required to prevent a detachment between the reinforcement structure and the other elements attached to the reinforcement structure.

Such a behavior can be obtained by increasing the strength of the steel used to make the reinforcement profiles to increase the mechanical properties of the reinforcement structure. However, in view of the complex geometry of the profiles and of the structure, the grade of the steel is necessarily limited to preserve a good formability of the steel to realize the reinforcement structure. Furthermore, the reduction of the wall thickness of the profiles to reduce the weight of reinforcement structure is also limited because the reinforcement structure then becomes too deformable in case of a front impact and the base of the reinforcement structure becomes too fragile in case of an impact against the roof of the vehicle compartment for example during a barrel roll. Consequently, the reinforcement structure has to remain quite heavy to preserve a good behavior in case of an impact.

SUMMARY OF THE INVENTION

An object of various embodiments of the present invention is to solve the above mentioned problems by providing a reinforcement structure having a good behavior without modifying the nature of the reinforcement profiles, but allowing a reduction of the wall thickness to reduce the weight of the reinforcement structure.

The present invention provides a reinforcement structure of the afore-mentioned type, wherein the reinforcement structure further comprises at least one reinforcement member extending along at least part of the elevation reinforcement profile in the elevation cavity between said elevation reinforcement profile and said compartment panel, said reinforcement member being made of a material having a tensile strength greater than the tensile strength of the material forming the elevation reinforcement profile. The reinforcement element allows, e.g., for local reinforcement of the reinforcement structure in order to increase the mechanical properties of the reinforcement structure. Consequently, the grade of the steel used to make the reinforcement profiles can remain adapted to a good formability of the steel to form the profiles, and the wall thickness of the profiles can also be reduced without being detrimental to the behavior of the reinforcement structure in case of an impact.

In some embodiments, the product of the yield strength by the wall thickness of the reinforcement member is such that the deformation of the reinforcement member is less than 5% in case of an impact at a speed less than 30 Km/h.

In some embodiments, the reinforcement member has a W or omega shaped cross-section.

In some embodiments, the reinforcement member comprises:
at least two parallel edges extending along the elevation direction and applied against a bottom of the elevation reinforcement profile substantially parallel to the compartment panel;
a wall joining the two edges said wall being spaced from the bottom and from the compartment panel; and
two branches extending from the edges to the compartment panel on either side of the wall.

In some embodiments, the reinforcement member is made of a material having a tensile strength greater than 1300 MPa.

In some embodiments, the reinforcement member is made of a cold rolled fully martensitic steel or of a press hardened steel.

In some embodiments, the elevation reinforcement profile and the transversal reinforcement profile are made of a material having a tensile strength substantially comprised between 300 and 600 MPa.

In some embodiments, the elevation reinforcement profile and the transversal reinforcement profile are made of a bake hardening steel or a high strength low alloy steel.

In some embodiments, the elevation reinforcement profile and the transversal reinforcement profile are integral.

In some embodiments, the elevation reinforcement profile extends between a lower end and an upper end, the reinforcement member extending from the lower end of the elevation reinforcement profile to an area of the elevation reinforcement profile extending between the lower end and the upper end of the elevation reinforcement profile.

In some embodiments, the transversal reinforcement profile is attached to an intermediate area of the elevation reinforcement profile, the reinforcement member extending from the lower end and to an area extending in the elevation direction past the intermediate area of the elevation reinforcement profile.

In some embodiments, the reinforcement structure comprises two transversal reinforcement profiles extending along parallel transversal directions, one of the transversal reinforcement profiles being attached to a first intermediate area of the elevation reinforcement profile, the other transversal reinforcement profile being attached to a second intermediate area of the elevation reinforcement profile, the reinforcement member extending from the lower end and to an area extending in the elevation direction between the first intermediate area and the second intermediate area of the elevation reinforcement profile.

In some embodiments, the lower end of the elevation reinforcement profile and the reinforcement member are attached to a longitudinal member extending along a longitudinal direction, substantially perpendicular to the elevation and to the transversal directions. In some embodiments, the reinforcement structure further comprises an attachment member connecting the elevation reinforcement profile and the reinforcement member to the longitudinal member.

In some embodiments, the reinforcement structure comprises at least two elevation reinforcement profiles extending along parallel directions, the transversal reinforcement profile connecting the elevation reinforcement profiles, the reinforcement structure comprising two reinforcement members each extending in the elevation cavity of one of the elevation reinforcement profiles.

In some embodiments, each of elevation reinforcement profiles and each of the reinforcement members are attached to a longitudinal reinforcement member.

The invention also provides a vehicle compartment for a heavy goods vehicle of the type comprising a floor, a roof, a front face, a rear face, said front face and rear face extending between the floor and the roof, and two lateral faces extending between the front and rear faces and between the floor and the roof, wherein the back face is formed of a reinforcement structure as described above.

In some embodiments, the vehicle compartment comprises a reinforcement structure comprising at least one elevation reinforcement profile extending along an elevation direction, said elevation reinforcement profile defining an elevation cavity; at least one transversal reinforcement profile extending along a transversal direction, substantially perpendicular to the elevation direction, said transversal reinforcement profile defining a transversal cavity; and at least one compartment panel extending against the elevation reinforcement profile and the transversal reinforcement profile such that the compartment panel closes the elevation and transversal cavities; wherein the reinforcement structure further comprises at least one reinforcement member extending along at least part of the elevation reinforcement profile in the elevation cavity between said elevation reinforcement profile and said compartment panel, said reinforcement member being made of a material having a tensile strength greater than the tensile strength of the material forming the elevation reinforcement profile, and the longitudinal member extends from the rear face to the front face under the floor of the vehicle compartment.

In some embodiments, the vehicle compartment further comprises at least one suspension element attached to the longitudinal member opposite the connection between the longitudinal member and the reinforcement structure.

BRIEF DESCRIPTION OF THE DRAWINGS

Other aspects and advantages of the present invention will appear upon reading the following description, given by way of example and made in reference to the appended drawings, wherein.

DETAILED DESCRIPTION

In the following description, the terms "rear" and "front" are defined according the usual directions of a mounted vehicle. The term "longitudinal" is defined according to the rear-front direction of the vehicle, the term "transversal" is defined according to the left-right direction of the vehicle and the term "elevation" is defined according to a direction substantially perpendicular to the longitudinal and transversal directions and corresponding to the vertical direction in normal use of the vehicle.

Figure 1:
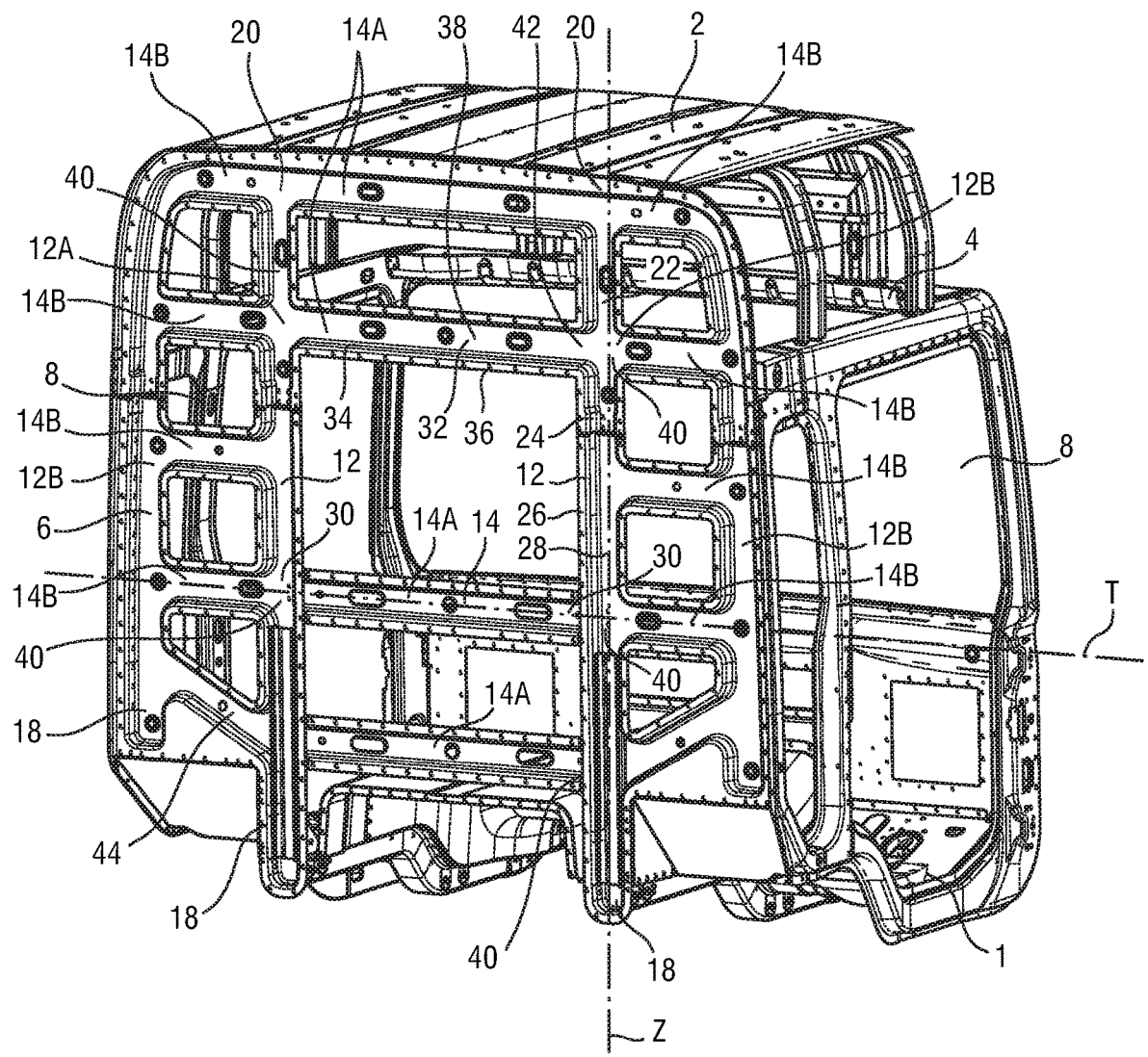
FIG. 1 is a perspective view of a vehicle compartment of a heavy goods vehicle comprising a reinforcement structure according to the present invention.
Figure 2:
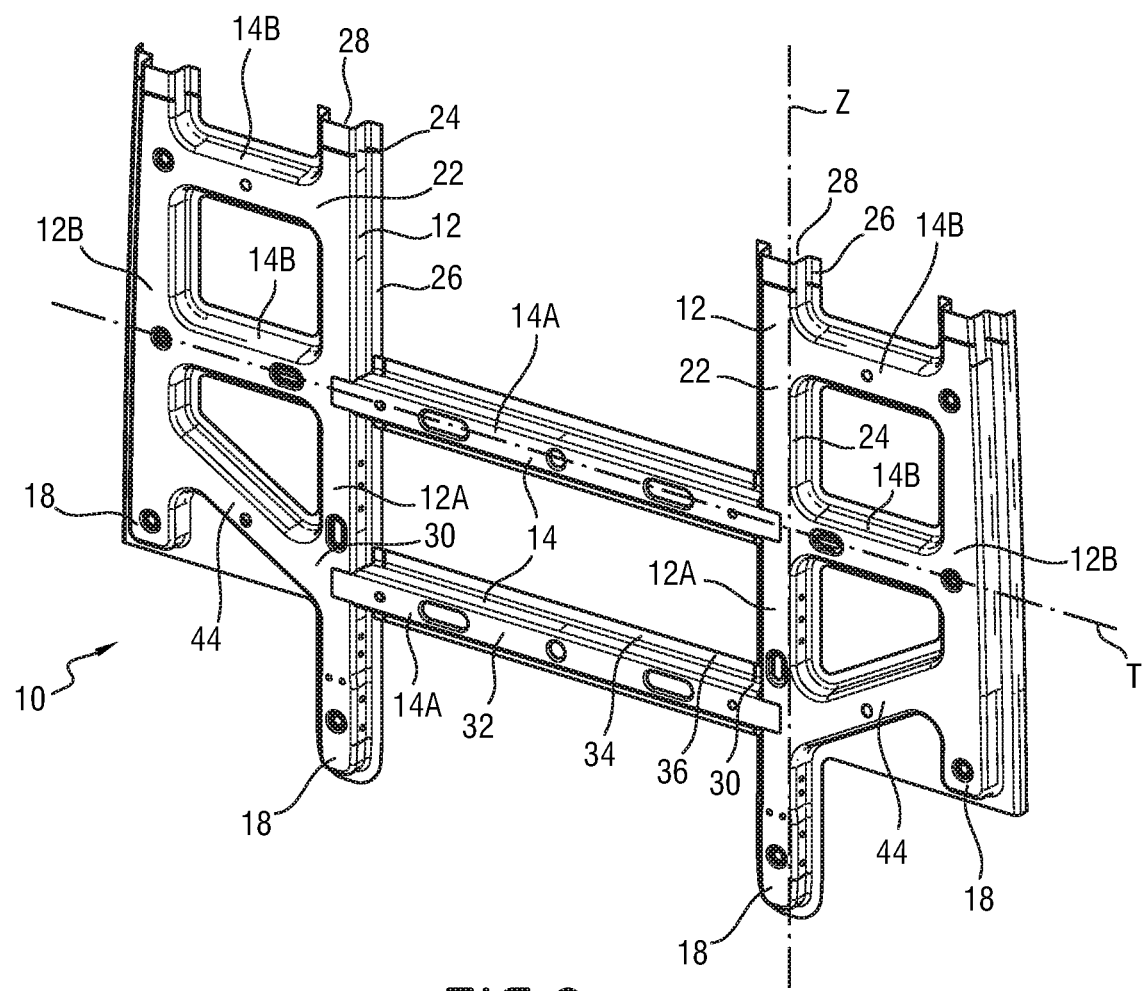
FIG. 2 is a perspective view of part of the reinforcement structure of FIG. 1.

With reference to FIG. 1, a vehicle compartment for a heavy goods vehicle is described. Such a heavy goods vehicle, also known as a truck or a lorry, is a vehicle having a weight of 3.5 tons or more.

The vehicle compartment is delimited by a floor 1, a roof 2, a front face 4 and a rear face 6 and two lateral faces 8, each mainly formed by rectilinear reinforcement members attached to panels forming the walls of the vehicle compartment. The floor 1 and the roof 2 extend mainly in a longitudinal and transversal plane. The front face 4 and the rear face 6 extend mainly in an elevation and transversal plane between the floor 1 and the roof 2, respectively between the front ends of the floor 1 and the roof 2 and between the rear ends of the floor 1 and the roof 2. The lateral faces 8 each extend mainly in an elevation and longitudinal plane between the lateral ends of the floor 1, the roof 2, the front face 4 and the rear face 6. The front face 4 is provided with a windshield and the lateral faces 8 are provided with doors. The floor 1, the roof 2, the front, rear and lateral faces define between them an inner volume where the occupants of the vehicle are seated.

The present invention relates more particularly to the rear face 6, and the other parts of the vehicle compartment will not be described in greater detail herein.

The rear face 6 is formed of a reinforcement structure 10 comprising at least one elevation reinforcement profile 12, at least one transversal reinforcement profile 14 and at least one compartment panel 16.

The elevation reinforcement profile 12 extends along an elevation direction Z between a lower end 18 and an upper end 20. In cross-section, i.e. in a plane substantially perpendicular to the elevation direction Z, the elevation reinforcement profile 12 has a U-shape. Consequently, the elevation reinforcement profile 12 comprises a bottom 22 and two branches 24 extending substantially perpendicularly to and on either sides of the bottom 22. At the end of each branch 24, opposite the bottom 22, the elevation reinforcement profile 12 for example comprises a fixing flange 26 extending substantially perpendicularly to the branch 24 and parallel to the bottom 22 towards the exterior of the elevation reinforcement profile 12. The bottom 22 and the branches 24 define between them a U-shaped elevation cavity 28.

According to the embodiment shown in the figures, the reinforcement structure 10 comprises two central elevation reinforcement profiles 12A and two external elevation reinforcement profiles 12B, all parallel to each other. The external elevation reinforcement profiles 12B extend on either side of the central elevation reinforcement profiles 12A and form the lateral edges of the reinforcement structure 10. The upper ends 20 of the central and external elevation reinforcement profiles 12A and 12B all extend at the same height, substantially corresponding to the height of the roof 2. The lower ends 18 of the central elevation reinforcement profiles 12A extend at a height different than the height of the external elevation reinforcement profiles 12B. More particularly, the lowers ends 18 of the central elevation reinforcement profiles 12A extend at a height inferior to the height of the floor 1 because these lower ends 18 are arranged to be attached to parts extending under the floor 1, as will be described subsequently. The lower ends 18 of the external elevation reinforcement profiles 12B extend at a height substantially corresponding to the height of the floor 1.

The transversal reinforcement profile 14 extends along a transversal direction T between two lateral ends 30. In cross-section, i.e. in a plane substantially perpendicular to the transversal direction T, the transversal reinforcement profile 14 has a U-shape. Consequently, the transversal reinforcement profile 14 comprises a bottom 32 and two branches 34 extending substantially perpendicularly to and on either sides of the bottom 32. At the end of each branch 34, opposite the bottom 32, the transversal reinforcement profile 14 for example comprises a fixing flange 26 extending substantially perpendicularly to the branch 34 and parallel to the bottom 32 towards the exterior of the transversal reinforcement profile 14. The bottom 32 and the branches 34 define between them a U-shaped transversal cavity 38.

The transversal reinforcement profile 14 connects with the elevation reinforcement profile 12 at an intermediate area 40 of the elevation reinforcement profile 12 extending between the lower end 18 and the upper end 20. The connection between the transversal reinforcement profile 14 and the elevation reinforcement profile 12 is such that the transversal cavity 38 opens into the elevation cavity 28, as shown in FIG. 1. Alternatively, the transversal cavity 38 and the elevation cavity 28 do not communicate with each other, meaning that a wall 42 separates the transversal cavity 38 from the elevation cavity 28, as also shown in FIG. 1. According to an embodiment, the transversal reinforcement profile 14 is connected to the elevation reinforcement profile 12 by one of its lateral end 30.

The elevation cavity 28 and the transversal cavity 28 are open towards the rear of the vehicle compartment.

According to the embodiment shown in the figures, the reinforcement structure 10 comprises four central transversal reinforcement profiles 14A and eight external transversal reinforcement profiles 14B. The central transversal reinforcement profiles 14A extend between the two central elevation reinforcement profiles 12A and are connected thereto by their lateral ends 30. Four of the external transversal reinforcement profiles 14B extend between one of the central elevation reinforcement profile 12A and one of the external elevation reinforcement profile 12B, and the other four external transversal reinforcement profile 14B extend between the other central elevation reinforcement profile 12A and the other external elevation reinforcement profile 12B and are connected to the central and external elevation reinforcement profiles 12A and 12B by their lateral ends 30. The central and external transversal reinforcement profiles 14A and 14B are distributed along the height of the central and external elevation reinforcement profiles 12A and 12B and are connected to the elevation reinforcement profiles at various intermediate areas 40 of the elevation reinforcement profiles. According to the embodiment shown in the figures, two of the external transversal reinforcement profiles 14B extend in the continuity of one of the central transversal reinforcement profile 14A, on either sides of the central elevation reinforcement elements 12A, meaning that two of external transversal reinforcement profile 14B extend along the same transversal axis as one of the central transversal reinforcement profile 14A. According to the embodiment shown in the figures, three of the central transversal reinforcement profiles 14A extend along the same transversal axes as six of the external transversal reinforcement profiles 14B. One central transversal reinforcement profile 14A and two external transversal reinforcement profiles 14B extend at the upper ends 20 of the elevation reinforcement profiles 12 and connect these upper ends 20 together. The remaining two external transversal reinforcement profiles 14B extend along the same transversal axis at an intermediate height between two central external transversal reinforcement profiles 14A.

In the embodiment shown in the figures, the reinforcement structure 10 further comprises two oblique reinforcement profiles 44 extending between the central elevation reinforcement profiles 12A and the external elevation reinforcement profiles 12B, on either side of the lowest central transversal reinforcement profile 14A. The oblique reinforcement profiles 44 extend along opposite inclined directions between the elevation and transversal directions.

The arrangement and number of elevation and transversal reinforcement profiles can vary from one reinforcement structure to another, depending on the architecture and dimensions of the vehicle compartment in which the reinforcement structure 10 is used.

The wall thickness of the elevation and transversal reinforcement profiles 12 and 14 is, for example, substantially comprised between 0.7 mm and 1.1 mm. In one embodiment, the wall thickness of the elevation reinforcement profiles 12 is around 1 mm, and the wall thickness of the transversal reinforcement profiles 14 is around 0.8 mm. The elevation and transversal reinforcement profiles 12 and 14 are made of a cold formable steel such as a bake hardening steel or a high strength low alloy steel having a tensile strength substantially comprised between 300 MPa and 600 MPa., which are particularly suitable for cold forming the complex shapes of the profiles. In one embodiment, the elevation reinforcement profiles 12 are made of a bake hardening steel having a tensile strength substantially comprised between 300 MPa and 400 MPa, and the transversal reinforcement profiles 14 are made of a high strength low alloy steel having a tensile strength substantially comprised between 400 MPa and 600 MPa. At least some of the elevation and transversal reinforcement profiles 12 and 14 can be integral. Alternatively, the elevation and transversal reinforcement profiles 12 and 14 are welded together.

The compartment panel 16 is applied against the elevation and transversal reinforcement profiles 12 and 14 such that the compartment panel 16 closes the elevation and transversal cavities 28 and 38. Consequently, the compartment panel 16 extends in a plane substantially parallel to the bottoms 22 and 32 elevation and transversal reinforcement profiles 12 and 14. The compartment panel 16 is applied against the fixing flanges 26 and 36 of the elevation and transversal reinforcement profiles 12 and 14 and is for example welded thereto. The compartment panel 16 can be made of a single panel covering all of the elevation and transversal reinforcement profiles 12 and 14, or of a plurality of panels attached together and each covering some of the elevation and transversal reinforcement profiles 12. The compartment panel 16 forms the back wall of the vehicle compartment which is visible from the exterior of the vehicle compartment.

Figure 4:
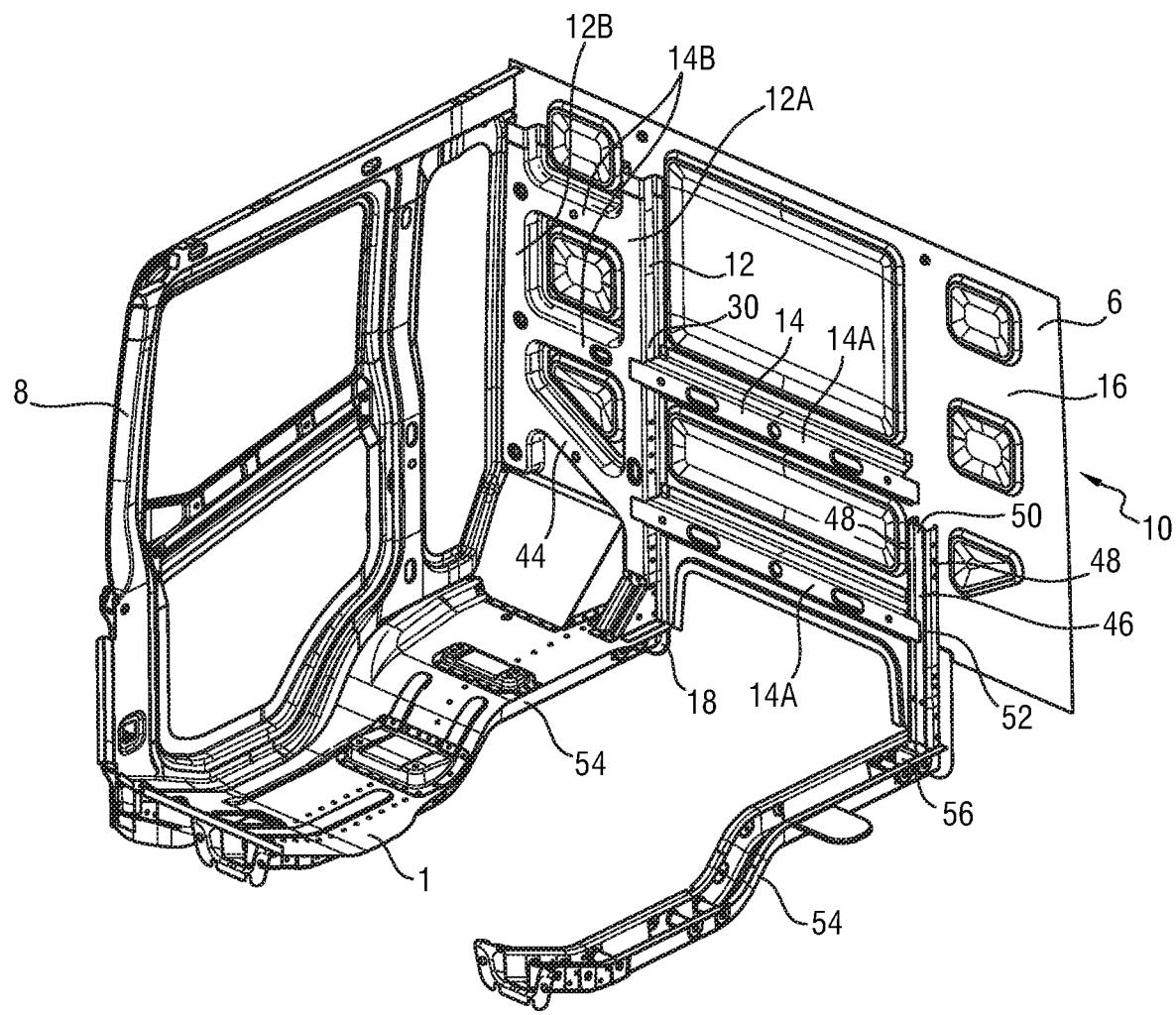
FIG. 4 is a perspective view of part of the interior a vehicle compartment comprising a reinforcement structure according to the present invention.
Figure 5:
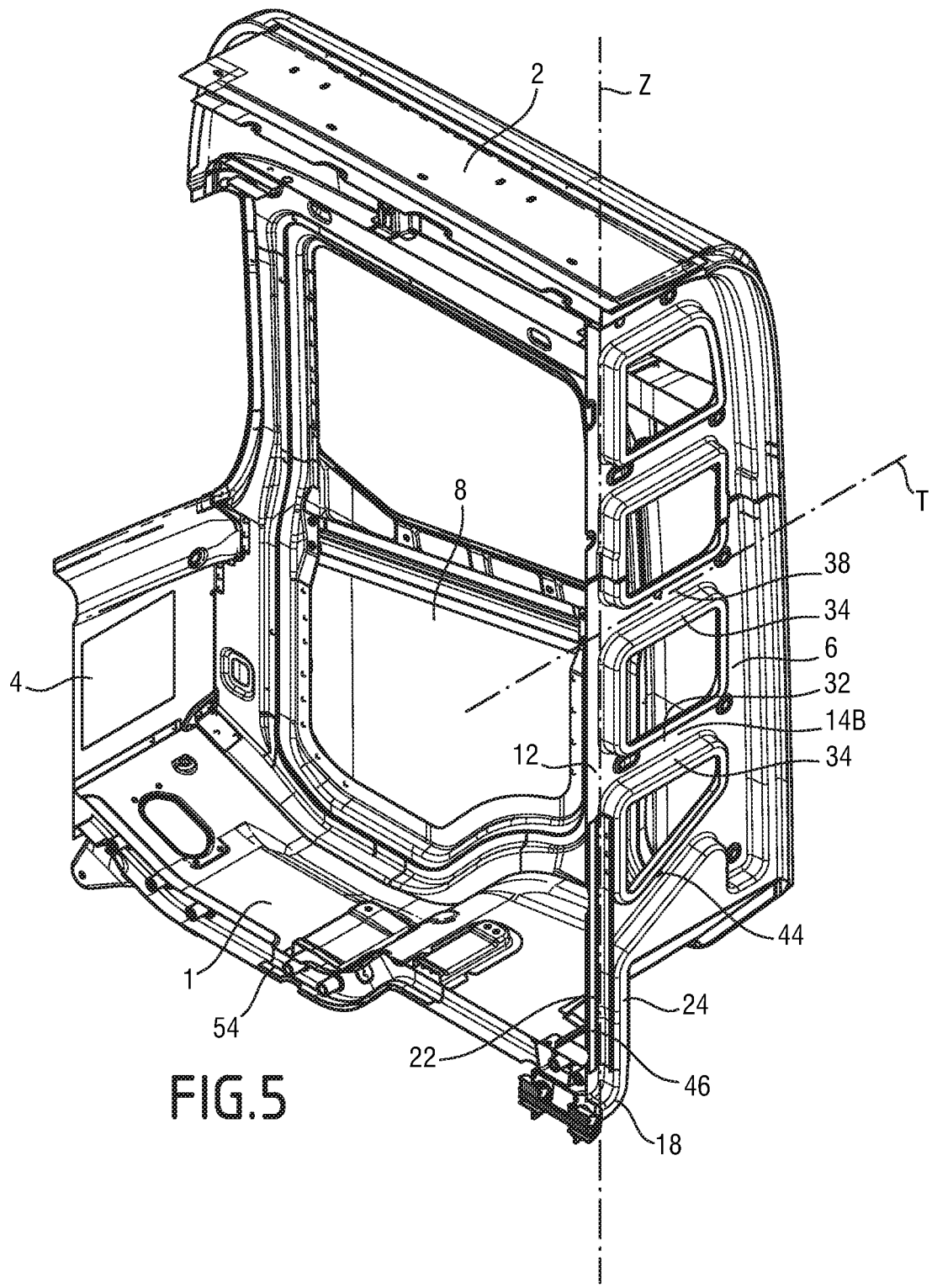
FIG. 5 is a cross-sectional view of part of the reinforcement structure according to the present invention.

The reinforcement structure 10 further comprises at least one reinforcement member 46 extending between the elevation reinforcement profile 12 and the compartment panel 16 in the elevation cavity 28 of the elevation reinforcement profile 12. More particularly, in the case where the reinforcement structure comprises several elevation reinforcement profiles 12 as described above, a reinforcement member 46 is placed in the elevation cavity 28 of each of the central elevation reinforcement profiles 12A. The reinforcement member 46 extends from the lower end 18 to an area of the elevation reinforcement profile extending in the elevation direction Z past an intermediate area 40 wherein the elevation reinforcement profile 12 is connected to the transversal reinforcement profile 12. In the case where the reinforcement structure comprises several transversal elevation reinforcement profiles 14, the reinforcement member 46 extends from the lower end 18 to an area extending between the intermediate area 40 wherein the lowest transversal reinforcement profile 14 to the elevation reinforcement profile 12 and a second intermediate area wherein the transversal reinforcement profile 14 adjacent to the lowest transversal reinforcement profile 14 is connected to the elevation reinforcement profile 12, as shown in FIGS. 4 and 5. In other words, the reinforcement member 46 is a localized reinforcement member arranged to reinforce the lower part, i.e. the base, of the elevation reinforcement profile 12.

Figure 3:
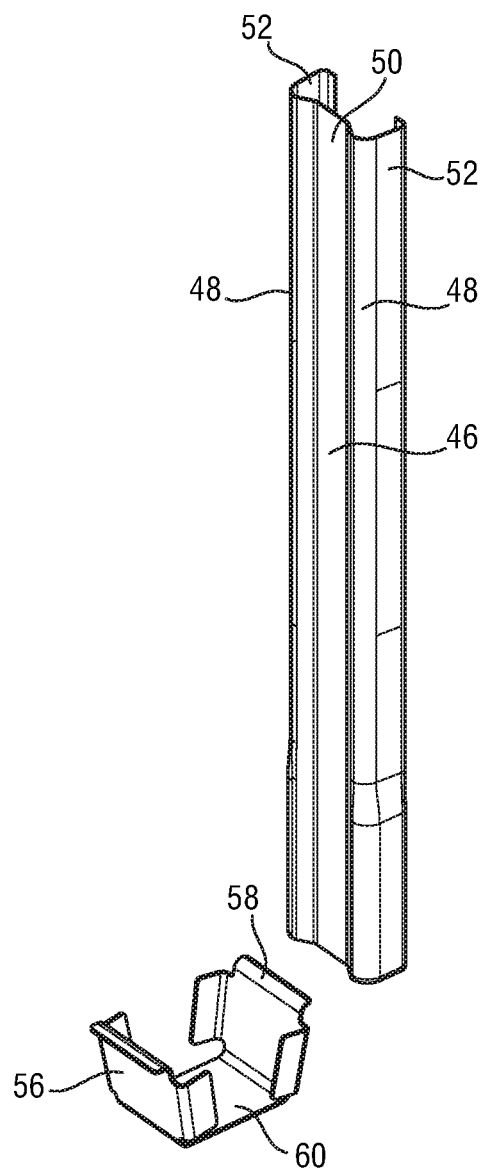
FIG. 3 is a perspective view of a reinforcement member and of an attachment member of a reinforcement structure according to the present invention.

The reinforcement member 46, as more particularly visible in FIG. 3, has, in cross-section, i.e. in a plane substantially perpendicular to the elevation direction Z, a W or omega shaped cross-section. More particularly, the reinforcement member comprises:
at least two parallel edges 48 extending along the elevation direction and applied against the bottom 22 of the elevation reinforcement profile 12;
a wall 50 joining the two edges 48 said wall being spaced from the bottom 22 and from the compartment panel 16; and
two branches 52 extending from the edges 48 to the compartment panel 16 on either side of the wall 50.

This shape is given as an example and the reinforcement member 46 could comprise more branches extending between the bottom 22 of the elevation reinforcement profile 12 and the compartment panel 16 to impart more rigidity to the reinforcement structure in the area where the reinforcement member 46 extends.

The reinforcement member 46 is attached to the elevation reinforcement profile 12 along all its length, i.e. in the elevation direction Z, for example by being welded at regular spots along its length to the elevation reinforcement profile.

The reinforcement member 46 has a wall thickness substantially comprises between 0.9 mm and 1.1 mm, for example around 1 mm. The material of the reinforcement member 46 has a tensile strength greater than the tensile strength of the material of the elevation reinforcement profile 12, meaning that the reinforcement member 46 improves the mechanical properties of the reinforcement structure 10 in the area where the reinforcement member 46 extends. The reinforcement member 46 is arranged to prevent any important plastic deformation of the environment where the reinforcement member 46 extends. More particularly, the reinforcement member is such that, in case of an impact at a speed less than 30 Km/h, the deformation of the reinforcement member is less than 5%, the impact being as defined in Tests A (or Front Impact Test), B (or Roof Strength test) or C (or Rear Wall Strength test) of the ECE (Economic Commission for Europe) regulation ECE-R29/03. To this end, the product of the yield strength Re by the wall thickness of the reinforcement member 46 is greater than the product of the yield strength Re by the wall thickness of the elevation and transversal reinforcement profiles 12 and 14 surrounding the reinforcement member 46.

To this end, the reinforcement member 46 is made of a material having a tensile strength greater than 1300 MPa. For example, the reinforcement member 46 is made of a cold rolled fully martensitic steel or of a press hardened steel and can be uncoated or coated with zinc-based coating or with an aluminum-based coating.

The composition of such steel may comprise, for example, in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration.

According to one embodiment, the steel composition comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of the press hardened part is comprised between 1300 and 1650 MPa.

According to another embodiment, the steel composition comprises for example, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration. With this composition range, the tensile strength of the press hardened part is higher than 1800 MPa.

The microstructure of such a steel comprises a large volume fraction of martensite, for example higher than 80%, or even 90%. Such a steel has very high mechanical characteristics, which makes it suitable for forming a reinforcement member intended to remain substantially underformed in case of an important load applied against the reinforcement member.

As explained previously, the lower end 18 of the central reinforcement profiles 12A are attached to parts extending under the floor 1 of the vehicle compartment. More particularly, each central reinforcement profile 12A is attached to a longitudinal member 54, or longitudinal rail, extending in the longitudinal direction under the floor 1 of the vehicle compartment. The longitudinal member 54 extends from the back face 6 to the front face 4 of the vehicle compartment. Such a longitudinal member 54 is arranged to protect the vehicle compartment and its passengers in case of an impact by absorbing a part of the energy of said impact and by preventing deformation of the floor structure of the vehicle compartment under which the longitudinal member extends. The attachment between the lower end 18 of the elevation reinforcement profile 12, the reinforcement member 46 and the longitudinal member 54 is obtained by using an attachment member 56 (FIGS. 3 and 4) comprising a fixing surface 58 welded to the lower end 18 of the elevation reinforcement profile 12 and to the reinforcement member 46 and a fixing surface 60 welded to the longitudinal member 54. Such an attachment member 56 allows a robust attachment between the longitudinal member 54 and the reinforcement structure 10.

A suspension element can also be attached to the longitudinal member opposite the connection between the longitudinal member 54 and the reinforcement structure 10. Such a suspension element allows, with other similar suspension elements, to suspend the vehicle compartment relative to the vehicle body of the heavy goods vehicle.

The reinforcement member 46 extending in the lower part of the elevation reinforcement profile 12, where the elevation reinforcement profile 12 is attached to surrounding parts of the vehicle allows reinforcing the attachment between the reinforcement structure 10 and these surrounding parts. More particularly, in case of an impact, the reinforcement structure 10 remains attached to the longitudinal member 54 and to the suspension element.

In case of a front impact, the energy from the impact is transmitted through the longitudinal member 54 to the reinforcement structure 10 which participates in the dissipation of this energy. During the impact, as explained previously, the reinforcement member 46 remains substantially undeformed and guides the deformations of the elevation and transversal reinforcement profiles 12, 14 surrounding the reinforcement element 46, these deformation being spread over a large part of the elevation and transversal reinforcement profiles, which increases the energy absorption. Consequently, the deformation of the reinforcement structure 10 is controlled, thanks to the reinforcement member 46. It should be noted that, without a reinforcement element, the deformations tend to be localized around the connection between the reinforcement structure and the longitudinal member and the energy absorption is reduced, whereas, with the reinforcement member, the deformations are spread in the reinforcement structure, in the elevation and transversal directions which increases the energy absorption. Furthermore, as explained above, the attachment between the reinforcement structure 10 and the longitudinal member 56 is not destroyed.

The same behavior is observed in case of an impact on the side of the vehicle and against the roof 2 of the vehicle compartment, for example during a barrel roll and the deformations are spread in the reinforcement structure 10 thanks to the reinforcement elements and do not remain localized in the lower part of elevation reinforcement profile 12 as it is the case when the reinforcement profile 12 is not reinforced. Furthermore, the energy is also transmitted to the suspension elements attached to the longitudinal members opposite the connection between the longitudinal member 54 and the reinforcement structure 10 and which remain attached in case of an impact. Consequently, the suspension elements can also participate in the energy absorption.

The reinforcement member 46 allows producing the elevation and transversal reinforcement profiles 12 and 14 to be produced in materials having a good formability and with a reduced thickness, which reduces the weight of the reinforcement structure 10.

What is claimed is:

1. A reinforcement structure for a vehicle compartment of a heavy goods vehicle, comprising:
   at least one elevation reinforcement profile extending along an elevation direction, said elevation reinforcement profile defining an elevation cavity;
   at least one transversal reinforcement profile extending along a transversal direction, substantially perpendicular to the elevation direction, said transversal reinforcement profile defining a transversal cavity; and
   at least one compartment panel extending against the elevation reinforcement profile and the transversal reinforcement profile such that the compartment panel closes the elevation and transversal cavities;
   wherein the reinforcement structure further comprises at least one reinforcement member extending along at least part of the elevation reinforcement profile in the elevation cavity between said elevation reinforcement profile and said compartment panel, said reinforcement member being made of a material having a tensile strength greater than the tensile strength of the material forming the elevation reinforcement profile.

2. The reinforcement structure according to claim 1, wherein the product of the yield strength by the wall thickness of the reinforcement member is such that a deformation of the reinforcement member is less than 5% in case of an impact at a speed less than 30 Km/h, the impact being as defined in tests A, B or C of the Economic Commission for Europe regulation ECE-R29/03.

3. The reinforcement structure according to claim 1, wherein the reinforcement member has a W or omega shaped cross-section.

4. The reinforcement structure according to claim 3, wherein the reinforcement member comprises:
   at least two parallel edges extending along the elevation direction and applied against a bottom of the elevation reinforcement profile substantially parallel to the compartment panel;
   a wall joining the two edges said wall being spaced from the bottom and from the compartment panel; and
   two branches extending from the edges to the compartment panel on either side of the wall.

5. The reinforcement structure according to claim 1, wherein the reinforcement member is made of a material having a tensile strength greater than 1300 MPa.

6. The reinforcement structure according to claim 1, wherein the reinforcement member is made of a cold rolled fully martensitic steel or of a press hardened steel.

7. The reinforcement structure according to claim 1, wherein the elevation reinforcement profile and the transversal reinforcement profile are made of a material having a tensile strength substantially comprised between 300 and 600 MPa.

8. The reinforcement structure according to claim 1, wherein the elevation reinforcement profile and the transversal reinforcement profile are made of a bake hardening steel or a high strength low alloy steel.

9. The reinforcement structure according to claim 1, wherein the elevation reinforcement profile and the transversal reinforcement profile are integral.

10. The reinforcement structure according to claim 1, wherein the elevation reinforcement profile extends between a lower end and an upper end, the reinforcement member extending from the lower end of the elevation reinforcement profile to an area of the elevation reinforcement profile extending between the lower end and the upper end of the elevation reinforcement profile.

11. The reinforcement structure according to claim 10, wherein the transversal reinforcement profile is attached to an intermediate area of the elevation reinforcement profile, the reinforcement member extending from the lower end and to an area extending in the elevation direction past the intermediate area of the elevation reinforcement profile.

12. The reinforcement structure according to claim 10, comprising two transversal reinforcement profiles extending along parallel transversal directions, one of the transversal reinforcement profiles being attached to a first intermediate area of the elevation reinforcement profile, the other transversal reinforcement profile being attached to a second intermediate area of the elevation reinforcement profile, the reinforcement member extending from the lower end and to an area extending in the elevation direction between the first intermediate area and the second intermediate area of the elevation reinforcement profile.

13. The reinforcement structure according to claim 10, wherein the lower end of the elevation reinforcement profile and the reinforcement member are attached to a longitudinal member extending along a longitudinal direction, substantially perpendicular to the elevation and to the transversal directions.

14. The reinforcement structure according to claim 13, further comprising an attachment member connecting the elevation reinforcement profile and the reinforcement member to the longitudinal member.

15. The reinforcement structure according to claim 1, comprising at least two elevation reinforcement profiles extending along parallel directions, the transversal reinforcement profile connecting the elevation reinforcement profiles, the reinforcement structure comprising two reinforcement members each extending in the elevation cavity of one of the elevation reinforcement profiles.

16. The reinforcement structure according to claim 15, wherein each of elevation reinforcement profiles and each of the reinforcement members are attached to a longitudinal reinforcement member.

17. A vehicle compartment for a heavy goods vehicle, comprising a floor, a roof, a front face, a rear face, said front face and rear face extending between the floor and the roof, and two lateral faces extending between the front and rear faces and between the floor and the roof, wherein the rear face is formed of a reinforcement structure according to claim 1.

18. The vehicle compartment according to claim 17, wherein the elevation reinforcement profile extends between a lower end and an upper end, the reinforcement member extending from the lower end of the elevation reinforcement profile to an area of the elevation reinforcement profile extending between the lower end and the upper end of the elevation reinforcement profile, wherein the lower end of the elevation reinforcement profile and the reinforcement member are attached to a longitudinal member extending along a longitudinal direction, substantially perpendicular to the elevation and to the transversal directions, wherein the longitudinal member extends from the rear face to the front face under the floor of the vehicle compartment.

* * * * *